US011215562B2

(12) United States Patent
Chen et al.

(10) Patent No.: US 11,215,562 B2
(45) Date of Patent: Jan. 4, 2022

(54) DEFORMABLE COVERS ON SENSORS AND RESERVOIRS

(71) Applicant: Hewlett-Packard Development Company, L.P., Spring, TX (US)

(72) Inventors: Chien-Hua Chen, Corvallis, OR (US); Michael Cumbie, Corvallis, OR (US); Viktor Shkolnikov, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 36 days.

(21) Appl. No.: 16/612,786

(22) PCT Filed: Aug. 28, 2017

(86) PCT No.: PCT/US2017/048835
§ 371 (c)(1),
(2) Date: Nov. 12, 2019

(87) PCT Pub. No.: WO2019/045673
PCT Pub. Date: Mar. 7, 2019

(65) Prior Publication Data
US 2020/0225162 A1 Jul. 16, 2020

(51) Int. Cl.
*B01L 3/00* (2006.01)
*G01N 21/65* (2006.01)
*G01N 21/62* (2006.01)

(52) U.S. Cl.
CPC ...... *G01N 21/658* (2013.01); *B01L 3/502715* (2013.01); *B01L 2200/0689* (2013.01); *B01L 2300/0663* (2013.01); *B01L 2300/123* (2013.01); *G01N 2021/651* (2013.01); *G01N 2201/0227* (2013.01)

(58) Field of Classification Search
CPC .... G01N 21/658; G01N 21/65; G01N 21/625; G01N 21/62; G01N 2201/0227; G01N 2201/022; G01N 2201/02; B01L 3/502715; B01L 3/5027; B01L 3/502; B01L 3/50; B01L 2200/0689; B01L 2200/06; B01L 2300/0663; B01L 2300/123; B01L 2300/12; B01L 2300/0627; B01L 2300/06
USPC .......................................... 422/502, 500, 50
See application file for complete search history.

(56) References Cited

U.S. PATENT DOCUMENTS

| | | | |
|---|---|---|---|
| 6,090,617 A | 7/2000 | Meserol | |
| 6,653,136 B1 | 11/2003 | Dodgson et al. | |
| 8,449,832 B2 | 5/2013 | Yao | |
| 8,691,592 B2* | 4/2014 | Chen ................ | B01L 3/502715 436/180 |
| 8,728,025 B2 | 5/2014 | Bennett et al. | |
| 8,765,062 B2* | 7/2014 | Linder .................. | G01N 21/76 422/82.05 |
| 9,091,656 B2 | 7/2015 | Lee et al. | |

(Continued)

OTHER PUBLICATIONS

Yanagisawa, Masahiro, et al. "Transmission-type plasmonic sensor for surface-enhanced Raman spectroscopy." Applied Physics Express 9, No. 12 (2016): 122002.

*Primary Examiner* — Christine T Mui
(74) *Attorney, Agent, or Firm* — Nwamu PC

(57) ABSTRACT

Examples include a fluid device. The fluid device includes a substrate, a sensor coupled on the substrate. A reservoir is formed in the substrate adjacent to the sensor. A deformable cover is disposed to seal the sensor and the reservoir on the substrate.

16 Claims, 5 Drawing Sheets

(56) References Cited

U.S. PATENT DOCUMENTS

| | | |
|---|---|---|
| 9,097,699 B2 | 8/2015 | Charlton et al. |
| 9,248,230 B2 * | 2/2016 | Geipel .................... G01L 11/02 |
| 2008/0217246 A1 * | 9/2008 | Benn ................ G01N 35/00029 |
| | | 210/645 |
| 2012/0271127 A1 | 10/2012 | Battrell et al. |
| 2017/0089838 A1 | 3/2017 | Shibayama et al. |

* cited by examiner

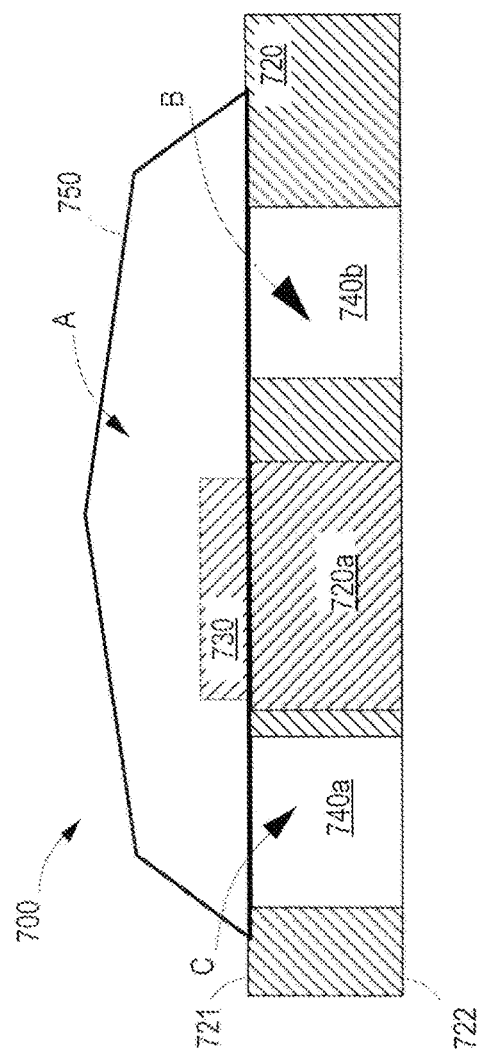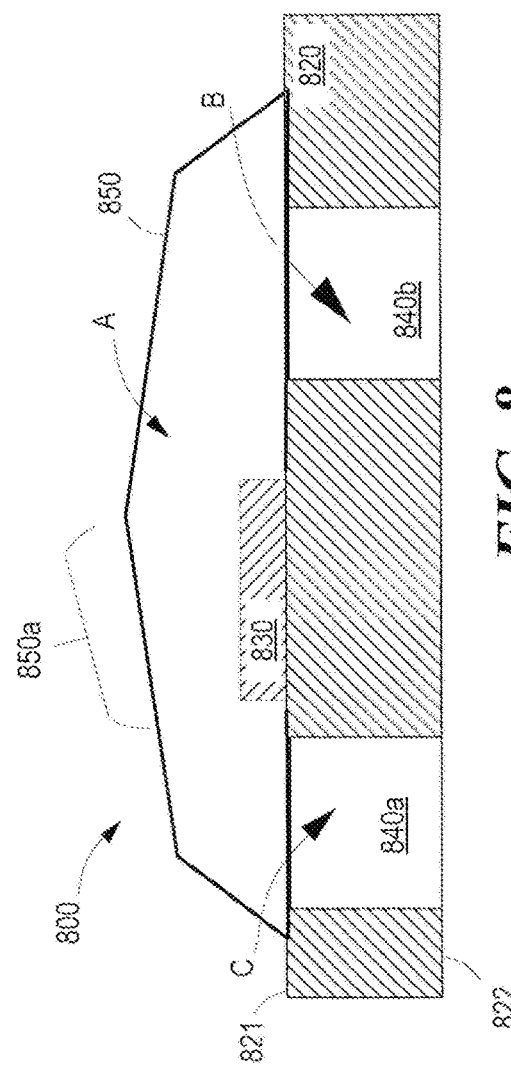

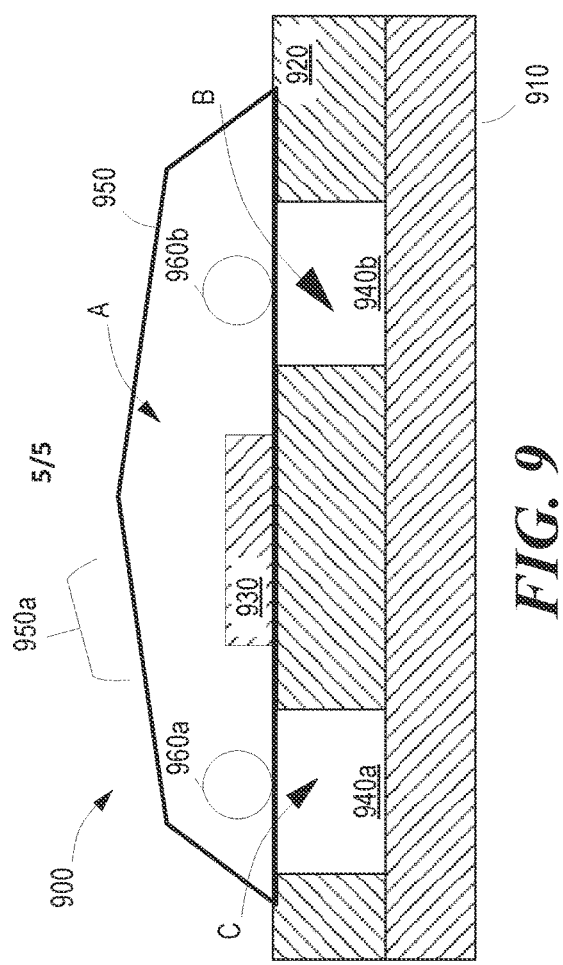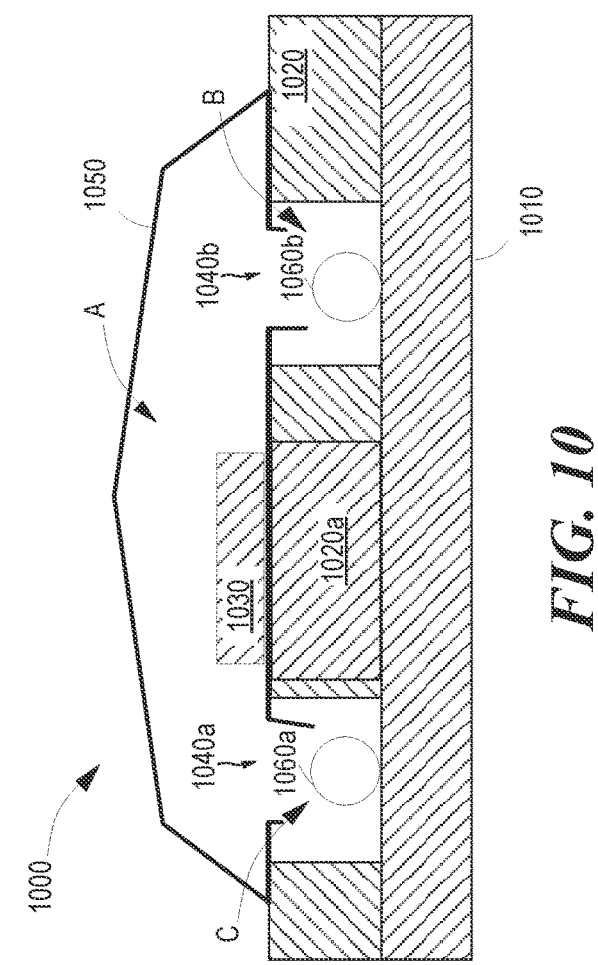

DEFORMABLE COVERS ON SENSORS AND RESERVOIRS

BACKGROUND

Various sensors have been developed to detect a number of events. Biological sensors or chemical sensors may sense biological or chemical properties of a samples. Some such sensors destroy the sample as part of the detection. Other sensors do not destroy or alter the sample as part of the detection. One such sensor may detect an optical signal generated by a chemical analysis of the sample. For examples, an optical sensor may be used to observe surface enhanced Raman scattering (SERS) from the sample.

DRAWINGS

Figure 5:
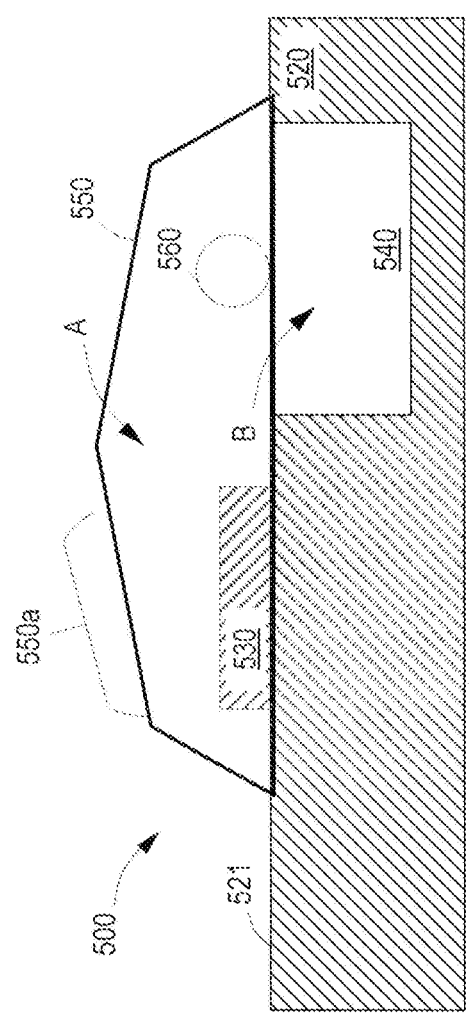

FIG. 5 a side view of some components of an example fluid device.

Figure 6:
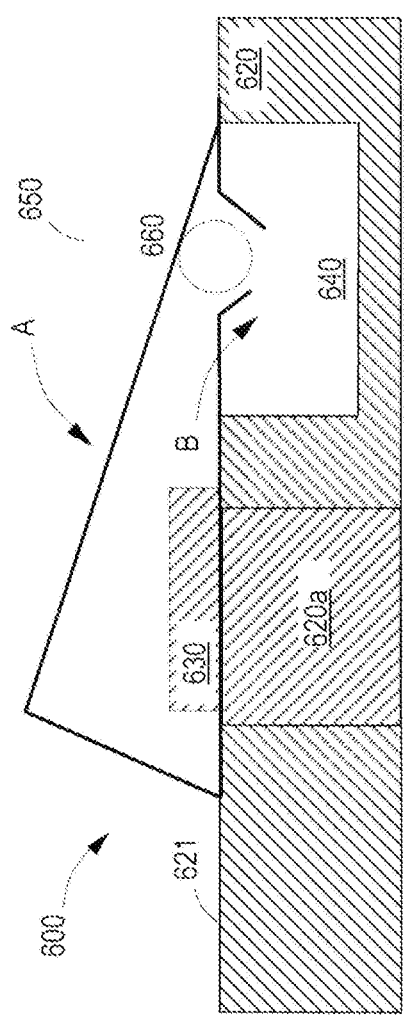

FIG. 6 is a side view of some components of an example fluid device.

FIG. 7 is a side view of some components of an example fluid device.

FIG. 8 is a side view of some components of an example fluid device.

FIG. 9 is a side view of some components of an example fluid device.

FIG. 10 is a side view of some components of an example fluid device.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DESCRIPTION

Examples of fluid devices may include a device to contain, receive, or provide a fluid. In some examples of fluid devices, a fluid in the device may be moved or mixed. In some examples, fluid devices may include a fluid ejection device to dispense or eject a fluid. In examples, a fluid device may include a sense region to house a sensor to detect characteristics of the fluid. In examples, a fluid device may include a substrate to couple to a sensor and provide a fluid thereto. In some examples, the sensor may be degraded if exposed to certain material or exposed to ambient conditions. A selection of material available for a substrates used to couple to the sensor may be carefully chosen to reduce or eliminate degradation. However, many such materials are expensive to use and there remains a need for a low cost and robust fluid device.

To address these issues, in the examples described herein, a fluid device is described in which a deformable cover may be used to seal a sensor and fluid reservoir from each other and ambient condition. In such an example, a substrate may be coupled to the sensor. In examples, the substrate may be used to form fluid reservoir(s) which may fluidly couple to the sensor. In some examples, the deformable cover may seal the sensor from direct contact with the substrate. In examples, the use of a deformable cover may allow for use of a larger number of materials for the fluid device as the sensor is isolated from the remainder of the fluid device. Furthermore, the use of the deformable cover may minimize interaction between the sensor and any material used for construction of the fluid device. Furthermore, the use of the deformable cover may protect the sensor from ambient conditions.

In examples, a substrate may refer to any layer of material to couple to a sensor and form a reservoir. In examples, multiple layers of materials may be used to form the fluid device. In such examples, the substrate refers to the layer to which the deformable cover is connected. In examples, the substrate may be comprised of at least one of silicon, a silicon compound, a plastic (e.g., an injection molded plastic), a cyclo-olefin polymer, an acrylic, a glass, a stainless steel, etc. In examples, the substrate may include electrical patterns to electrically couple to the sensor. In examples, a panel of the fluid device may refer to layer(s) of material not connected to the deformable cover. In examples, the panel may be composed of the same material as the substrate. In other examples, the panel may be composed of a different material as the substrate.

Figure 1:
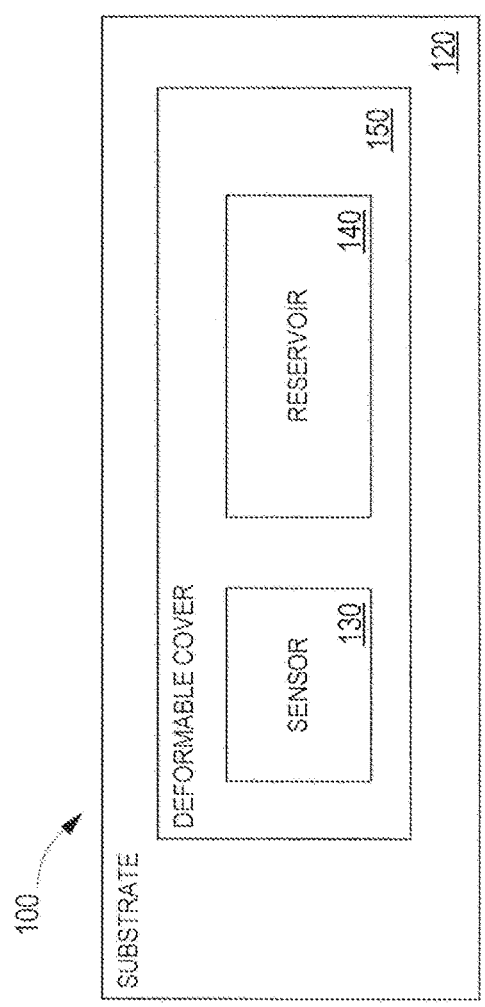
FIG. 1 is a block diagram of some components of an example fluid device.

Turning now to the figures, and particularly to FIG. 1, this figure provides a block diagram of some components of an example device 100. The example device 100 comprises a substrate 120, a sensor 130, a reservoir 140, and a deformable cover 150.

In examples, substrate 120 may be formed of any material to support a sensor and form a reservoir. In some examples, substrate 120 may be a clear or transparent material. As used herein, the term "clear" or "transparent" refers to a material through which light may pass. In some examples, the clear material may be any of Poly methyl methacrylate (PMMA), polystyrene, polycarbonate, Polydimethylsiloxane (PDMS), silicon, a cyclo-olefin polymer, etc.

In examples described herein, sensor 130 is coupled to or disposed on a surface of substrate 120. In the following discussion and in the claims, the term "couple" or "coupled" is intended to include suitable indirect and/or direct connections. Thus, if a first component is described as being coupled to a second component, that coupling may, for example, be: (1) through a direct electrical or mechanical connection, (2) through an indirect electrical or mechanical connection via other devices and connections, (3) through an optical electrical connection, (4) through a wireless electrical connection, and/or (5) another suitable coupling. In addition, the term "dispose" or "disposed" is intended to include suitable indirect and/or direct connections. In contrast, the term "connect," "connects," or "connected" is intended to include direct mechanical and/or electrical connections. In examples, sensor 130 may be any type of sensor to be coupled to a substrate. For example, sensor 130 may be an optical sensor. In examples, an optical sensor may be any sensor to detect an optical signal. For example, an optical sensor may detect a surface enhanced Raman scattering (SERS) effect. In such an example, the sensor 130 may include nano-structure(s) to receive a sample (e.g., a fluid or solid) for testing and a spectrometer to detect a Raman signature from the nano-structure. As used herein, a "SERS substrate," refers to the nano-structure(s) to receive a sample for testing. In some examples, the spectrometer may be disposed on a separate location of the substrate 120 from the SERS substrate. In other examples, sensor 130 may include both the SERS substrate and spectrometer.

In examples, reservoir 140 is formed in substrate 120. In examples, a reservoir may be formed in a substrate by extracting a portion of substrate. In other examples, a substrate may be formed to include a reservoir, for example by extrusion. In examples, sensor 130 may be disposed to be adjacent to reservoir 140. In such examples, reservoir 140 may be fluidly coupled to sensor 130. In such an example, a fluid in reservoir 140 may move into contact with sensor 130 in any manner. For example, a fluid disposed in reservoir 140 may be pushed or pulled to fluidly couple to sensor 130. In some examples, a pump may be disposed in reservoir 140 to push fluid therein into contact with sensor 130. In such an example, the pump may be a resistor, a thermal ejector, piezoelectric ejector, etc. In other examples, a member may be moved into or through reservoir 140 to displace fluid towards sensor 130. In one such example, the member may be a piercing member to pierce or deform deformable cover 150.

In examples, a deformable cover 150 may be disposed to seal sensor 130 and reservoir 140 on the substrate. In examples, deformable cover 150 may provide a gas tight compartment for sensor 130 and/or reservoir 140. In some examples, sensor 130 and reservoir 140 may be disposed in separate compartments formed by the deformable cover. In examples, deformable cover 150 may be formed of any material to seal a component to a substrate and to deform in response to an applied pressure to unseal the component. In examples, deformable cover 150 may be formed of at least one of a metal foil, a polymer laminated metal foil, a polymer (e.g., a plastic), a glass, a silicon sheet, etc. In some examples, a gas may be disposed inside the deformable cover 150. In one such example, an inert gas (e.g., nitrogen) may be disposed therein. In some examples, deformable cover 150 may include a transparent region. In one such example, the transparent region may be disposed to at least partially cover sensor 130. In examples, the transparent region may be comprised of a clear or transparent material to allow an optical signal or light to pass therethrough. In other examples, the entire deformable cover may be comprised of a transparent or clear material to allow an optical signal or light to pass therethrough. In an example, an optical signal from sensor 130 may travel through the transparent region of deformable cover 150 to be detected by a detector. For example, if sensor 130 is a SERS substrate, any optical signal emitted by the SERS substrate may travel through the transparent region of deformable cover 150 to a spectrometer or other optical detector.

Figure 2:
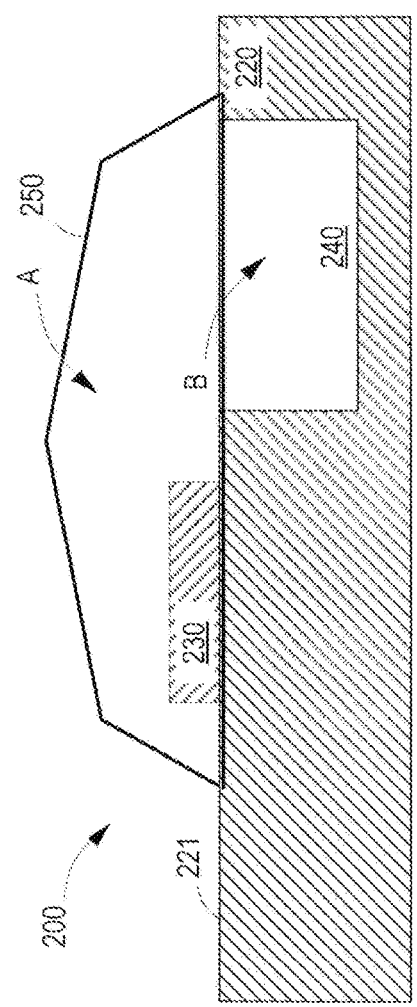
FIG. 2 is a side view of some components of an example fluid device.

FIG. 2 provides a side view of some components of an example fluid device 200. The fluid device 200 may include all features discussed with reference to the examples of FIG. 1. As shown in this example, fluid device 200 includes a substrate 220, a sensor 230, a reservoir 240, and a deformable cover 250. The substrate 220 includes a first surface 221. In examples, substrate 220 may be formed of any material to support a sensor and form a reservoir. In some examples, substrate 220 may be a clear or transparent material. In other examples, substrate 220 may include a clear or transparent region.

In examples, a sensor 230 may be coupled to first surface 221 of substrate 220. In examples, sensor 230 may be any type of sensor to be coupled to a substrate. For example, sensor 230 may be an optical sensor. In an example, sensor 230 may be a SERS substrate. In other examples, sensor 230 may include both the SERS substrate and spectrometer. In examples, sensor 230 may be disposed to be adjacent to reservoir 240. In such an example, sensor 230 may be disposed to be fluidly coupled to reservoir 240.

In the example of FIG. 2, at least a portion of deformable cover 250 may be connected to substrate 220 to seal reservoir 240 and sensor 230. In such an example, sensor 230 may be disposed on a portion of deformable cover 250 disposed on substrate 220. In such an example, sensor 230 may be connected to deformable cover 250. In examples, deformable cover 250 may be disposed to form a sealed compartment A in which sensor 230 may be disposed. In some examples, sealed compartment A may be filled with an inert gas. In other examples, sealed compartment A may be filled with air. In examples, deformable cover 250 may be disposed to form a sealed compartment B in which reservoir 240 may be disposed. In examples, sealed compartment A and B may be gastight. In examples, a gastight compartment may not be allow a gas or fluid to enter or exit a compartment under a given pressure. In such an example, when deformable cover 250 is deformed or pierced a gas or fluid may enter compartment A and/or compartment B depending on the extent of the deformation. In the example of FIG. 2, the use of deformable cover 250 to connect to the sensor 230 may allow for use of a wider variety of material for substrate 220.

Figure 3:
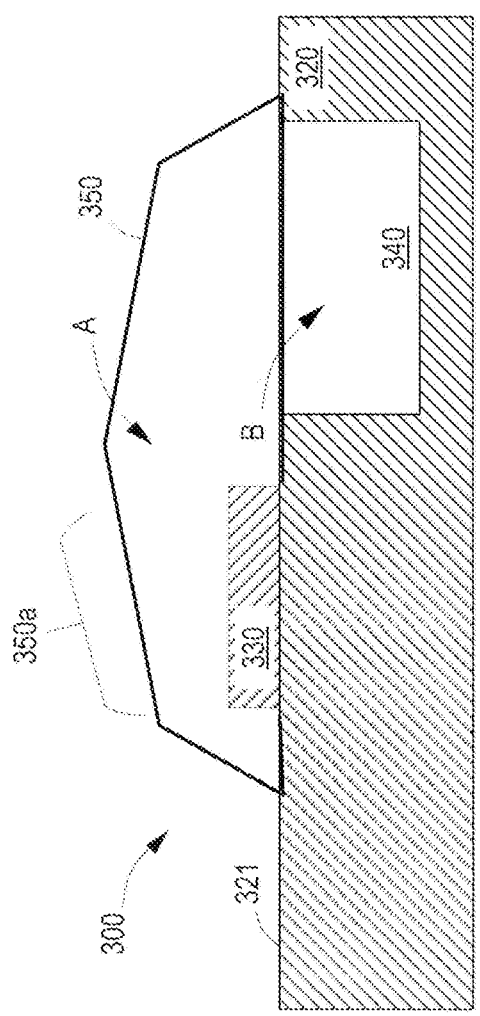
FIG. 3 is a side view of some components of an example fluid device.

Turning now to FIG. 3, this figure illustrates a side view of some components of an example fluid device. The fluid device 300 may include all features discussed with reference to the examples of FIGS. 1-2. As shown in this example, fluid device 300 includes a substrate 320, a sensor 330, a reservoir 340, and a deformable cover 350. In examples, substrate 320 may be formed of any material to support a sensor and form a reservoir. In some examples, substrate 320 may include a clear or transparent region.

In examples, substrate 320 includes a first surface 321. In examples, sensor 330 may be any type of sensor to be coupled to a substrate. For example, sensor 330 may be an optical sensor. In an example, sensor 330 may be a SERS substrate. In other examples, sensor 330 may include both the SERS substrate and spectrometer. In examples, sensor 330 may be disposed to be adjacent to reservoir 340. In such an example, sensor 330 may be disposed to be fluidly coupled to reservoir 340.

In the example of FIG. 3, at least a portion of deformable cover 350 may be connected to substrate 320 to seal reservoir 340 and sensor 330. In this example, sensor 330 may be disposed on substrate 320 and deformable cover 350 is not disposed to connect to sensor 330. In examples, deformable cover 350 may be disposed to form a sealed compartment A in which sensor 330 may be disposed. In examples, deformable cover 350 may be disposed to form a sealed compartment B in which reservoir 340 may be disposed. In examples, sealed compartment A and B may be gastight. In such an example, when deformable cover 350 is deformed or pierced a gas or fluid may enter compartment A and/or compartment B depending on the extent of the deformation. In some examples, one or more of sealed compartment A and compartment B may be filled with an inert gas. In other examples, sealed compartment A and/or compartment B may be filled with air.

In this example, device 300 further includes a transparent region 350a of deformable cover 350 disposed over at least a portion of sensor 330. In examples, transparent region 350a may be comprised of a clear or transparent material to allow an optical signal or light to pass therethrough. In such examples, an optical signal from sensor 330 may travel through transparent region 350a to be detected by a detector. For example, if sensor 330 is a SERS substrate, any optical signal emitted by the SERS substrate may travel through the transparent region 350a. In examples, transparent region 350a may be configured to remain disposed over at least a portion of sensor 330 when deformable cover 350 is deformed.

Figure 4:
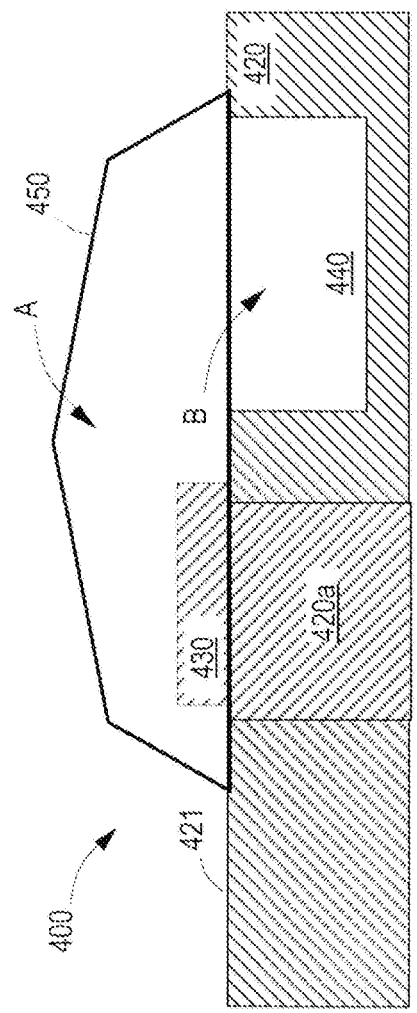
FIG. 4 is a side view of some components of an example fluid device.

FIG. 4 provides a side view of some components of an example fluid device 400. Fluid device 400 may include all features discussed with reference to the examples of FIGS. 1-3. As shown in this example, fluid device 400 includes a substrate 420, a sensor 430, a reservoir 440, and a deformable cover 450. In examples, substrate 420 may be formed of any material to support a sensor and form a reservoir. In this example, substrate 420 includes a clear or transparent region 420a. Further in this examples, sensor 430 may be disposed at least partially in the transparent region 420a.

In examples, substrate 420 includes a first surface 421. In examples, sensor 430 may be any type of sensor to be coupled to a substrate. For example, sensor 430 may be an optical sensor. In an example, sensor 430 may be a SERS substrate. In other examples, sensor 430 may include both the SERS substrate and spectrometer. In examples, sensor 430 may be disposed to be adjacent to reservoir 440. In such an example, sensor 430 may be disposed to be fluidly coupled to reservoir 440.

In the example of FIG. 4, at least a portion of deformable cover 450 may be connected to substrate 420 to seal reservoir 440 and sensor 430. In such an example, sensor 430 may be disposed on a portion of deformable cover 450 disposed on substrate 420. In such an example, sensor 430 may be connected to deformable cover 450. In examples, deformable cover 450 may be disposed to form a sealed compartment A in which sensor 430 may be disposed. In examples, deformable cover 450 may be disposed to form a sealed compartment B in which reservoir 440 may be disposed. In examples, sealed compartment A and B may be gastight. In such an example, when deformable cover 450 is deformed or pierced a gas or fluid may enter compartment A and/or compartment B depending on the extent of the deformation. In some examples, one or more of sealed compartment A and/or compartment B may be filled with an inert gas. In other examples, sealed compartment A and/or compartment B may be filled with air.

In this example, device 400 further includes a transparent region 420a of substrate 420. In examples, sensor 430 may be disposed over at least a portion of transparent region 420a. In examples, the transparent region 420a may be comprised of a clear or transparent material to allow an optical signal or light to pass therethrough. In such examples, an optical signal from sensor 430 may travel through transparent region 420a to be detected by a detector. For example, if sensor 430 is a SERS substrate, any optical signal emitted by the SERS substrate may travel through the transparent region 420a. Although shown as a region of substrate 420, the examples are not limited thereto, and all of substrate 420 may be a clear or transparent material. In the example of FIG. 4, the use of deformable cover 450 may allow for a greater variety of material to be used for transparent region 420a and substrate 420.

FIG. 5 provides a side view of some components of an example fluid device 500. Fluid device 500 may include all features discussed with reference to the examples of FIGS. 1-4. As shown in this example, fluid device 500 includes a substrate 520, a sensor 530, a reservoir 540, a deformable cover 550, and a piercing member 560. In examples, substrate 520 may be formed of any material to support a sensor and form a reservoir.

In examples, substrate 520 includes a first surface 521. In examples, sensor 530 may be any type of sensor to be coupled to a substrate. For example, sensor 530 may be an optical sensor. In an example, sensor 530 may be a SERS substrate. In other examples, sensor 530 may include both the SERS substrate and spectrometer. In examples, sensor 530 may be disposed to be adjacent to reservoir 540. In such an example, sensor 530 may be disposed to be fluidly coupled to reservoir 540.

In the example of FIG. 5, at least a portion of deformable cover 550 may be connected to substrate 520 to seal reservoir 540 and sensor 530. In such an example, sensor 530 may be disposed on a portion of deformable cover 550 disposed on substrate 520. In such an example, sensor 530 may be connected to deformable cover 550. In examples, deformable cover 550 may be disposed to form a sealed compartment A in which sensor 530 may be disposed. In examples, deformable cover 550 may be disposed to form a sealed compartment B in which reservoir 540 may be disposed. In examples, sealed compartment A and B may be gastight. In such an example, when deformable cover 550 is deformed or pierced a gas or fluid may enter compartment A and/or compartment B depending on the extent of the deformation. In some examples, one or more of sealed compartment A and/or compartment B may be filled with an inert gas. In other examples, sealed compartment A and/or compartment B may be filled with air.

In examples, device 500 includes a transparent region 550a of deformable cover 550 disposed over at least a portion of sensor 530. In examples, transparent region 550a may be comprised of a clear or transparent material to allow an optical signal or light to pass therethrough. In such examples, an optical signal from sensor 530 may travel through transparent region 550a to be detected by a detector. For example, if sensor 530 is a SERS substrate, any optical signal emitted by the SERS substrate may travel through transparent region 550a. In examples, transparent region 550a may be configured to remain disposed over at least a portion of sensor 530 when deformable cover 550 is deformed.

In this example, device 500 further includes piercing member 560 to deform or pierce deformable cover 550 to fluidly couple sensor 530 and reservoir 540. In examples, a piercing member may be comprised of any material with sufficient strength to pierce or deform a deformable cover. Although shown as a sphere, a piercing member may have any shape to deform or pierce a deformable cover. In examples, piercing member 560 may be disposed on a portion of deformable cover 550 disposed to seal reservoir 540 and form compartment B. In examples, piercing member 560 may deform or pierce deformable cover 550 in response to a force applied to a portion of deformable cover 550 which is transferred to piercing member 560. In some examples, piercing member 560 may enter reservoir 540 and displace a fluid therein towards sensor 530. In the example of FIG. 5, the use of deformable cover 550 to connect to the sensor 530 may allow for use of a wider variety of material for substrate 520.

FIG. 6 provides a side view of some components of an example fluid device 600. Fluid device 600 may include all features discussed with reference to the examples of FIGS. 1-5. As shown in this example, fluid device 600 includes a substrate 620, a sensor 630, a reservoir 640, a deformable cover 650, and a piercing member 660. In examples, substrate 620 may be formed of any material to support a sensor and form a reservoir. In this example, substrate 620 includes a clear or transparent region 620a. Further in this examples, sensor 630 may be disposed at least partially in the transparent region 620a.

In examples, substrate 620 includes a first surface 621. In examples, sensor 630 may be any type of sensor to be coupled to a substrate. For example, sensor 630 may be an optical sensor. In an example, sensor 630 may be a SERS substrate. In other examples, sensor 630 may include both the SERS substrate and spectrometer. In examples, sensor 630 may be disposed to be adjacent to reservoir 640. In such an example, sensor 630 may be disposed to be fluidly coupled to reservoir 640.

In the example of FIG. 6, at least a portion of deformable cover 650 may be connected to substrate 620 to seal reservoir 640 and sensor 630. In such an example, sensor 630 may be disposed on a portion of deformable cover 650 disposed on substrate 620. In such an example, sensor 630 may be connected to deformable cover 650. In examples, deformable cover 650 may be disposed to form a sealed compartment A in which sensor 630 may be disposed. In examples, deformable cover 650 may be disposed to form a sealed compartment B in which reservoir 640 may be disposed. In examples, sealed compartment A and B may be gastight. In some examples, sealed compartment A may be filled with an inert gas. In other examples, sealed compartment A may be filled with air. In this example, piercing member 660 is depicted to have pierced deformable cover 650 to allow a gas or fluid disposed in reservoir 640 to fluidly couple to sensor 630. In the example of FIG. 6, both compartment A and compartment B are unsealed by piercing member 620. In the example of FIG. 6, the use of deformable cover 650 may allow for a greater variety of material to be used for transparent region 620a and substrate 620.

Turning now to FIG. 7, this figure provides a side view of some components of an example fluid device 700. Fluid device 700 may include all features discussed with reference to the examples of FIGS. 1-6. As shown in this example, fluid device 700 includes a substrate 720, a sensor 730, a channel 740a, a channel 740b, and a deformable cover 750. In examples, substrate 720 may be formed of any material to support a sensor. In this example, channel 740a and channel 740b may extend from a first surface 721 of substrate 720 through substrate 720 to an opposing second surface 722 of substrate 720. In examples, channel 740a and channel 740b may be part of a microfluidic channel structure. In such an example, substrate 720 may be coupled to another layer (not shown) to form the microfluidic channel structure. As used herein, a microfluidic channel structure refers to a structure that includes channel(s) to hold a fluid. In examples, the channel(s) may be dimensioned to have a width along the direction of travel of a fluid or gas in the channel of 1 micron (1 μm) to 10 millimeters (10 mm). In examples, the microfluidic channel structure may allow for a flow of a fluid or a gas to sensor 730.

In this example, substrate 720 may include a clear or transparent region 720a. Further in this example, sensor 730 may be disposed at least partially in the transparent region 720a. In examples, substrate 720 may be disposed on first surface 721. In examples, sensor 730 may be any type of sensor to be coupled to a substrate. For example, sensor 730 may be an optical sensor. In an example, sensor 730 may be a SERS substrate. In other examples, sensor 730 may include both the SERS substrate and spectrometer. In examples, sensor 730 may be disposed to be adjacent to channel 740a and channel 740b. In such an example, sensor 730 may be disposed to be fluidly coupled to channel 740a and channel 740b. As shown in FIG. 7, sensor 730 may be disposed between channel 740a and channel 740b. However, the examples are not limited thereto and sensor 730 may disposed in any arrangement to fluidly couple to channel 740a and channel 740b.

In the example of FIG. 7, at least a portion of deformable cover 750 may be connected to substrate 720 to seal channel 740a, channel 740b, and sensor 730. In one such example, sensor 730 may be disposed on a portion of deformable cover 750 disposed on substrate 720. In such an example, sensor 730 may be connected to deformable cover 750. In other examples, sensor 730 may be connected to substrate 720. In examples, deformable cover 750 may be disposed to form a sealed compartment A in which sensor 730 may be disposed. In examples, deformable cover 750 may be disposed to form a sealed compartment B in which channel 740b may be disposed. In examples, deformable cover 750 may be disposed to form a sealed compartment C in which channel 740a may be disposed. In examples, sealed compartment A, compartment B, and compartment C may be gastight. In such an example, when deformable cover 750 is deformed or pierced a gas or fluid may enter one or more of compartment A, compartment B, and compartment C depending on the extent of the deformation. In some examples, one or more of sealed compartment A, compartment B, and compartment C may be filled with an inert gas. In other examples, one or more of sealed compartment A, compartment B, and compartment C may be filled with air. In the example of FIG. 7, the use of deformable cover 750 may allow for a greater variety of material to be used for transparent region 720a and substrate 720.

FIG. 8 provides a side view of some components of an example fluid device 800. Fluid device 800 may include all features discussed with reference to the examples of FIGS. 1-7. As shown in this example, fluid device 800 includes a substrate 820, a sensor 830, a channel 840a, a channel 840b, and a deformable cover 850. In examples, substrate 820 may be formed of any material to support a sensor and form channel 840a and channel 840b. In this example, channel 840a and channel 840b may extend from a first surface 821 of substrate 820 through substrate 820 to an opposing second surface 822 of substrate 820. In examples, channel 840a and channel 840b may be part of a microfluidic channel structure. In such an example, substrate 820 may be coupled to another layer (not shown) to form the microfluidic channel structure. In examples, the microfluidic channel structure may allow for a flow of a fluid or a gas to sensor 830.

In examples, substrate 820 may be connected to first surface 821. In examples, sensor 830 may be any type of sensor to be coupled to a substrate. For example, sensor 830 may be an optical sensor. In an example, sensor 830 may be a SERS substrate. In other examples, sensor 830 may include both the SERS substrate and spectrometer. In examples, sensor 830 may be disposed to be adjacent to channel 840a and channel 840b. In such an example, sensor 830 may be disposed to be fluidly coupled to channel 840a and channel 840b. As shown in FIG. 8, sensor 830 may be disposed between channel 840a and channel 840b. However, the examples are not limited thereto and sensor 830 may disposed in any arrangement to fluidly couple to channel 840a and channel 840b.

In this example, device 800 includes a transparent region 850a of deformable cover 850 disposed over at least a portion of sensor 830. In examples, transparent region 850a may be comprised of a clear or transparent material to allow an optical signal or light to pass therethrough. In such examples, an optical signal from sensor 830 may travel through transparent region 850a to be detected by a detector. For example, if sensor 830 is a SERS substrate, any optical signal emitted by the SERS substrate may travel through the transparent region 850a. In examples, transparent region 850a may be configured to remain disposed over at least a portion of sensor 830 when deformable cover 850 is deformed.

In the example of FIG. 8, at least a portion of deformable cover 850 may be connected to substrate 820 to seal channel 840a, channel 840b, and sensor 830. In this example, sensor 830 may not be disposed on deformable cover 850. In such an examples, sensor 830 may be connected to substrate 820. In examples, deformable cover 850 may be disposed to form a sealed compartment A in which sensor 830 may be disposed. In examples, deformable cover 850 may be disposed to form a sealed compartment B in which channel 840b may be disposed. In examples, deformable cover 850 may be disposed to form a sealed compartment C in which channel 840a may be disposed. In examples, sealed compartment A, B, and C may be gastight. In such an example, when deformable cover 850 is deformed or pierced a gas or fluid may enter one or more of compartment A, compartment B, and compartment C depending on the extent of the deformation. In some examples, one or more of sealed compartment A, compartment B, and compartment C may be filled with an inert gas. In other examples, one or more of sealed compartment A, compartment B, and compartment C may be filled with air. In the example of FIG. 8, the use of deformable cover 850 may allow for a greater variety of material to be used for substrate 820.

FIG. 9 provides a side view of some components of an example fluid device 900. Fluid device 900 may include all features discussed with reference to the examples of FIGS. 1-8. As shown in this example, fluid device 900 includes a panel 910, a substrate 920, a sensor 930, a channel 940a, a channel 940b, a deformable cover 950, a piercing member 960a, and piercing member 960b. In examples, substrate 920 may be formed of any material to support a sensor and form channel 940a and channel 940b. In examples, panel 910 may be any panel to couple to substrate 920. In examples, panel 920 may be a molded panel. In some examples, a molded panel may be at least one of a plastic (e.g., an injection molded plastic), a cyclo-olefin polymer, an acrylic, a glass, a stainless steel, etc.

In examples, sensor 930 may be disposed on a first surface 921 of substrate 920. In examples, sensor 930 may be any type of sensor to be coupled to a substrate. For example, sensor 930 may be an optical sensor. In an example, sensor 930 may be a SERS substrate. In other examples, sensor 930 may include both the SERS substrate and spectrometer. In examples, sensor 930 may be disposed to be adjacent to channel 940a and channel 940b. In such an example, sensor 930 may be disposed to be fluidly coupled to channel 940a and channel 940b. As shown in FIG. 9, sensor 930 may be disposed between channel 940a and channel 940b. However, the examples are not limited thereto and sensor 930 may disposed in any arrangement to fluidly couple to channel 940a and channel 940b.

In the example of FIG. 9, at least a portion of deformable cover 950 may be connected to substrate 920 to seal channel 940a, channel 940b, and sensor 930. In one such example, sensor 930 may be disposed on a portion of deformable cover 950 disposed on substrate 920. In such an example, sensor 930 may be connected to deformable cover 950. In other examples, sensor 930 may be connected to substrate 920. In examples, deformable cover 950 may be disposed to form a sealed compartment A in which sensor 930 may be disposed. In examples, deformable cover 950 may be disposed to form a sealed compartment B in which channel 940b may be disposed. In examples, deformable cover 950 may be disposed to form a sealed compartment C in which channel 940a may be disposed. In examples, sealed compartment A, compartment B, and compartment C may be gastight. In such an example, when deformable cover 950 is deformed or pierced a gas or fluid may enter one or more of compartment A, compartment B, and compartment C depending on the extent of the deformation. In some examples, one or more of sealed compartment A, compartment B, and compartment C may be filled with an inert gas. In other examples, sealed compartment A, compartment B, and compartment C may be filled with air.

In examples, device 900 includes a transparent region 950a of deformable cover 950 disposed over at least a portion of sensor 930. In examples, transparent region 950a may be comprised of a clear or transparent material to allow an optical signal or light to pass therethrough. In such examples, an optical signal from sensor 930 may travel through transparent region 950a to be detected by a detector. For example, if sensor 930 is a SERS substrate, any optical signal emitted by the SERS substrate may travel through the transparent region 950a. In examples, transparent region 950a may be configured to remain disposed over at least a portion of sensor 930 when deformable cover 950 is deformed.

In this example, device 900 further includes piercing member 960a and piercing member 960b to deform or pierce deformable cover 950 to fluidly couple sensor 930 and channel 940a and channel 940b. In examples, piercing member 960b may be disposed on a portion of deformable cover 950 disposed to seal channel 940b and form compartment B. In examples, piercing member 960a may be disposed on a portion of deformable cover 950 disposed to seal channel 940a and form compartment C. In examples, piercing member 960a and piercing member 960b may deform or pierce deformable cover 950 in response to a force applied to a portion of deformable cover 950 which is transferred to piercing member 960a and piercing member 960b. In other examples, a force may be applied to piercing member 960a and piercing member 960b without deforming the portion of deformable cover 950 extending above sensor 930. In one such example, piercing member 960a and piercing member 960b may be comprised of a metal or metal alloy and a magnetic force may be applied to move piercing member 960a and piercing member 960b to pierce deformable cover 950 over channel 940a and channel 940, respectively. In some examples, piercing member 960a may enter channel 940a and displace a fluid therein towards sensor 930. In some examples, piercing member 960b may enter channel 940b and displace a fluid therein towards sensor 930. In the example of FIG. 9, the use of deformable cover 950 may allow for a greater variety of material to be used for substrate 920 and panel 910.

FIG. 10 provides a side view of some components of an example fluid device 1000. Fluid device 1000 may include all features discussed with reference to the examples of FIGS. 1-9. As shown in this example, fluid device 1000 includes a panel 1010, a substrate 1020, a sensor 1030, a channel 1040a, a channel 1040b, a deformable cover 1050, a piercing member 1060a, and piercing member 1060b. In examples, substrate 1020 may be formed of any material to support a sensor and form channel 1040a and channel 1040b. In examples, panel 1010 may be any panel to couple to substrate 1020. In examples, panel 1020 may be a molded panel.

In examples, sensor 1030 may be disposed on a first surface 1021 of substrate 1020. In examples, sensor 1030 may be any type of sensor to be coupled to a substrate. For example, sensor 1030 may be an optical sensor. In an example, sensor 1030 may be a SERS substrate. In other examples, sensor 1030 may include both the SERS substrate and spectrometer. In examples, sensor 1030 may be disposed to be adjacent to channel 1040*a* and channel 1040*b*. In such an example, sensor 1030 may be disposed to be fluidly coupled to channel 1040*a* and channel 1040*b*. As shown in FIG. 10, sensor 1030 may be disposed between channel 1040*a* and channel 1040*b*. However, the examples are not limited thereto and sensor 1030 may disposed in any arrangement to fluidly couple to channel 1040*a* and channel 1040*b*.

In the example of FIG. 10, at least a portion of deformable cover 1050 may be connected to substrate 1020 to seal channel 1040*a*, channel 1040*b*, and sensor 1030. In one such example, sensor 1030 may be disposed on a portion of deformable cover 1050 disposed on substrate 1020. In such an example, sensor 1030 may be connected to deformable cover 1050. In other examples, sensor 1030 may be connected to substrate 1020. In examples, deformable cover 1050 may be disposed to form a sealed compartment A in which sensor 1030 may be disposed. In examples, deformable cover 1050 may be disposed to form a sealed compartment B in which channel 1040*b* may be disposed. In examples, deformable cover 1050 may be disposed to form a sealed compartment C in which channel 1040*a* may be disposed. In examples, sealed compartment A, compartment B, and compartment C may be gastight. In such an example, when deformable cover 1050 is deformed or pierced a gas or fluid may enter one or more of compartment A, compartment B, and compartment C depending on the extent of the deformation. In some examples, one or more of sealed compartment A, compartment B, and compartment C may be filled with an inert gas. In other examples, one or more of sealed compartment A, compartment B, and compartment C may be filled with air.

In examples, device 1000 includes a transparent region 1020*a* of substrate 1020. In the example, sensor 1030 may be disposed over at least a portion of transparent region 1020*a*. In examples, transparent region 1020*a* may be comprised of a clear or transparent material to allow an optical signal or light to pass therethrough. In such examples, an optical signal from sensor 1030 may travel through transparent region 1020*a* to be detected by a detector. For example, if sensor 1030 is a SERS substrate, any optical signal emitted by the SERS substrate may travel through the transparent region 1020*a*.

In this example, device 1000 further includes piercing member 1060*a* and piercing member 1060*b* shown deforming or piercing deformable cover 1050 to fluidly couple sensor 1030 and channel 1040*a* and channel 1040*b*. In examples, piercing member 1060*b* may pierce a portion of deformable cover 1050 disposed to seal channel 1040*b* and form compartment B. In examples, piercing member 1060*a* may pierce on a portion of deformable cover 1050 disposed to seal channel 1040*a* and form compartment C. In examples, piercing member 1060*a* and piercing member 1060*b* may deform or pierce deformable cover 1050 in response to a force applied to thereto. In examples, a magnetic force may be applied to piercing member 1060*a* and piercing member 1060*b*. In such example, piercing member 1060*a* and piercing member 1060*b* may be comprised of a metal or metal alloy. In some examples, piercing member 1060*a* may enter channel 1040*a* and displace a fluid therein towards sensor 1030. In some examples, piercing member 1060*b* may enter channel 1040*b* and displace a fluid therein towards sensor 1030. In this example, piercing member 1060*a* and piercing member 1060*b* are depicted to have pierced deformable cover 1050 to allow a gas or fluid disposed in channel 1040*a* and channel 1040*b* to fluidly couple to sensor 1030. In the example of FIG. 10, compartment A, compartment B, and compartment C are unsealed by piercing member 1060*a* and piercing member 1060*b*. However, the examples are not limited thereto and one of piercing member 1060*a* and piercing member 1060*b* may pierce deformable cover 1050 while the other does not. In the example of FIG. 10, the use of deformable cover 1050 may allow for a greater variety of material to be used for substrate 1020 and panel 1010.

Accordingly, examples provided herein may implement a fluid device comprising a substrate. As discussed a sensor may be coupled to the substrate. A reservoir may be formed in the substrate adjacent to the sensor. A deformable cover may be disposed to seal the sensor and the reservoir on the substrate. As will be appreciated, using a deformable cover to seal a sensor and reservoir formed in a substrate may reduce degradation of the sensor due to contamination from ambient conditions and the substrate. Furthermore, sealing the sensor from contact with the substrate, may facilitate use of a larger number of materials for the substrate.

While various examples are described herein, elements and/or combinations of elements may be combined and/or removed for various examples contemplated hereby. The preceding description has been presented to illustrate and describe examples of the principles described. This description is not intended to be exhaustive or to limit these principles to any precise form disclosed. Many modifications and variations are possible in light of the description. Therefore, the foregoing examples provided in the figures and described herein should not be construed as limiting of the scope of the disclosure, which is defined in the Claims.

The invention claimed is:

1. A fluid device, comprising:
   a substrate including a sense region;
   a microfluidic channel structure formed in the substrate and including a first channel;
   a sensor disposed in the sense region to lie above the microfluidic channel structure and adjacent to the first channel; and
   a non-flat deformable cover on the substrate that includes both the microfluidic channel structure and the sensor to seal the sensor from contact with a fluid in the microfluidic channel structure and ambient conditions, the fluid to be fluidly coupled to the sensor when the deformable cover is deformed.

2. The device of claim 1, further comprising:
   a transparent region of the non-flat deformable cover disposed over at least a portion of the sensor.

3. The device of claim 1, further comprising:
   a transparent region of the substrate, the sensor being disposed at least partially in the transparent region.

4. The device of claim 1, wherein the sensor is an optical sensor.

5. The device of claim 4, wherein the optical sensor is a SERS substrate.

6. The device of claim 1, further comprising:
   a second channel of the microfluidic channel structure to be fluidly coupled to the sensor.

7. A fluid device, comprising:
   a substrate;
   a sensor coupled to the substrate;

a reservoir formed in the substrate adjacent to the sensor; and a non-flat deformable cover disposed to seal the sensor and the reservoir on the substrate.

8. The device of claim 7, wherein the reservoir and the sensor are disposed in separate compartments formed by the non-flat deformable cover.

9. The device of claim 7, wherein the reservoir is disposed to be fluidly coupled to the sensor.

10. The device of claim 7, wherein the non-flat deformable cover is to provide a gastight compartment for the sensor.

11. The device of claim 7, further comprising:
a transparent portion of the non-flat deformable cover to be disposed over at least a portion of the sensor.

12. The device of claim 7, further comprising:
a transparent region of the substrate, the sensor disposed on the transparent region.

13. The device of claim 12, wherein the sensor is a SERS substrate.

14. A device, comprising:
a substrate including a transparent region;
a SERS substrate disposed at least partially in the transparent region;
a fluid reservoir formed in the substrate to be fluidly coupled to the SERS substrate; and
a non-flat deformable cover disposed to seal the SERS substrate from the fluid reservoir in a gastight compartment on the substrate.

15. The device of claim 14, further comprising:
a piercing member to pierce the deformable cover to fluidly couple the fluid reservoir with the SERS substrate.

16. The device of claim 15 wherein the piercing member is to move into the fluid reservoir to displace fluid toward the SERS substrate.

* * * * *